United States Patent Office 3,763,127
Patented Oct. 2, 1973

3,763,127
HALOGEN CONTAINING ESTERS OF VINYL ARLENE ACETIC ACID AND POLYMERS THEREOF
Richard J. Dolinski, Jerry D. De Vrieze, and Robert M. Nowak, Midland, Mich., assignors to The Dow Chemical Company, Midland, Mich.
No Drawing. Original application June 15, 1970, Ser. No. 46,499, now Patent No. 3,649,668. Divided and this application Oct. 4, 1971, Ser. No. 186,445
Int. Cl. C08f 3/50, 3/64, 15/16
U.S. Cl. 260—86.7                                      5 Claims

ABSTRACT OF THE DISCLOSURE

Polymerizable, halogen containing esters of the following formula are disclosed

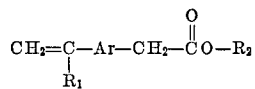

where Ar is a bivalent aromatic group of 6–20 carbons, $R_1$ is hydrogen or methyl and $R_2$ is a halogenated group derived from a primary alkyl alcohol having from 5 to about 10 carbons wherein the carbon adjacent to a carbon bearing a halogen has no hydrogens, a halogenated phenyl group or a halogenated allyl group.

BACKGROUND OF THE INVENTION

Halogen containing esters of (vinylaryl)acetic acid are the subject of this invention. Vinyl aromatic oxymethyl oxy compounds are disclosed in U.S. 3,100,804, vinyl aromatic acetic halides in U.S. 3,159,674 and alkylene aromatic acetamides and acetates in U.S. 3,073,862.

This is a division of application Ser. No. 46,499, filed June 15, 1970, and now U.S. 3,649,668.

SUMMARY OF THE INVENTION

The present invention is directed to polymerizable halogen containing esters of (vinylaryl)acetic acid which may be copolymerized with other monomers such as styrene and the like to produce self-extinguishing properties in the copolymer.

The esters may be represented by the formula

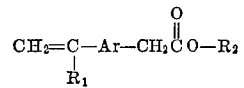

where Ar is an aromatic group of 6 to 20 carbons such as phenylene or naphthylene, $R_1$ is hydrogen or a methyl group and $R_2$ is a halogen containing group derived from a primary alkyl alcohol having from 5 to about 10 carbons wherein the carbon adjacent to a carbon bearing a halogen has no hydrogens, a halogen substituted phenyl group or a halogen containing allyl group, wherein said halogen is one or more chlorine or bromine atoms.

DETAILED DESCRIPTION OF THE INVENTION

The halogen containing esters of the above formula may be prepared by esterification of the corresponding (vinylaryl)acetic acid. For convenience in illustrating said esters and a method for their preparation the preparation of a tribromoneopentyl ester of (vinylphenyl)acetic acid will be described in the following example.

EXAMPLE 1

Preparation of (vinylphenyl)acetic acid

Said acid was prepared in a dry flask equipped with a stirrer, condenser and a $CaCl_2$ drying tube by adding a solution of 88.9 g. (0.56 mol) of ar-vinylbenzyl chloride (mixture of isomers) in ether to an ether slurry of 14.1 g. (0.58 g. atom) of magnesium turnings. The reaction started spontaneously and the addition of the chloride was regulated such that a gentle reflux was maintained. After about 1 hr., the reaction mixture was allowed to cool to room temperature and stirred for an additional 1.5 hrs. The mixture was then cooled to −7° C., and dry $CO_2$ gas was added to the stirred mixture above the level of the liquid at a rate such that the temperature did not exceed −2° C. After approximately 1 hr., $CO_2$ addition was stopped and the mixture was hydrolyzed while still cold with 320 ml. of 25% $H_2SO_4$. The organic layer was separated, washed twice with 200 ml. of $H_2O$ and the combined aqueous fractions back extracted with ether. The ethereal solution was dried over $MgSO_4$ and evaporated in vacuo to give 93.5 g. of crude acid which was recrystallized from 60–70° C. naphtha to give 53.2 g. of pure acid. An alternative purification scheme involved dissolution of the crude acid in 250 ml. of ether, and extraction with five 100 ml. portions of a saturated aqueous $NaHCO_3$ solution. The combined aqueous fractions were acidified to a pH of about 2 with concentrated HCl and the resultant crystalline product was recovered by filtration and dried at 40° C. in a vacuum oven to yield 44.6 g. of pure acid. The acid was a light tan solid, M.P. 74.7° C.

Calc. for $C_{10}H_{10}O_2$ (percent): C, 74.1; H, 6.17. Found (percent): C, 73.85; H, 6.15.

The IR spectrum of the acid in $CCl_4$ had a strong carbonyl band centered at 1700 cm.$^{-1}$, a broad peak for the hydroxyl group at 3000 cm.$^{-1}$ and peaks at 910 and 990 cm.$^{-1}$ for the $-CH=CH_2$ group. The NMR spectrum had a multiplet centered at 2.83τ for the aromatic protons, a quartet at 3.36 for the vinyl proton alpha to the benzene ring ($H_a$), two doublets centered at 4.36τ for the vinyl proton trans to $H_a(H_c)$, two doublets centered at 4.83τ for the vinyl proton cis to $H_a(H_b)$, a singlet at 6.52τ for the benzyl protons, and a singlet at −1.90τ for the hydroxyl proton ($J_{ab}$=10.5 c.p.s., $J_{ac}$=17.5 c.p.s., $J_{bc}$=1.5 c.p.s.; chemical shifts are relative to tetramethylsilane (TMS) as an internal standard and given the value of 10).

Preparation of tribromoneopentyl ester (Vinylphenyl)acetic acid (66.5 g., 0.41 mol), tribromoneopentyl alcohol (130.0 g., 0.40 mol) and 50 mg. of dinitroorthocresol (DNOC) were dissolved in 750 ml. of benzene in a flask equipped with a magnetic stirrer, heating mantle and a Dean-Stark water trap. To this mixture was added 4 ml. of Ultra TX acid (a modified toluene sulfonic acid, Witco Chemical Co.; it was found that this acid worked better than toluene sulfonic acid) and the solution was heated at reflux with stirring for 65 hours. At this time an additional 1 ml. of Ultra TX acid and 10.0 g. of (vinylphenyl)acetic acid were added and reflux continued. After 145 hrs. 6 ml. (83% of theoretical) of water had collected in the trap. The solvent was evaporated and the resultant brown oil was dissolved in 400 ml. of $CCl_4$ and dried over $MgSO_4$. This solution was chromatographed over 150 g. of alumina to yield 171.8 g. of an oil which was rechromatographed over 300 g. of alumina with 700 ml. of 7:1 hexane-benzene yielding 115 g. of a yellow oil which solidified slowly in a freezer (−20° C.). The oil contained 97% of said tribromoneopentyl ester and its infrared spectrum revealed a strong band at 1740 cm.$^{-1}$ for the carbonyl of the ester group and strong bands at 910 and 990 cm.$^-$ for a $-CH=CH_2$ group. The NMR spectrum contained the expected peaks for the vinyl and aromatic protons as well as singlets at 5.93τ (benzyl) methylene protons), at 6.48τ (—OCH₂—) and at 6.73τ (—CH₂Br).

Calc. for $C_{15}H_{17}Br_3O_2$ (percent): C, 38.4; H, 3.62; Br, 51.2. Found (percent): C, 38.6; H, 3.64; Br, 50.1.

Any of the esters corresponding to the previous formula may be prepared in a manner similar to the above. The phenylene group may be replaced by a naphthylene group by substituting an equivalent amount of (vinylnaphthyl)methyl chloride for the ar-vinylbenzyl chloride, for example.

Halogen containing alcohols and phenols which may be used to prepare the esters of this invention according to the above method include halogenated phenols such as p-bromophenol, 2,4-dibromophenol, 2,4,5-tribromophenol and the like; halogenated vinylic alcohols such as 2,3,3-tribromoallyl alcohol and the like; and halogenated primary alkyl alcohols having from 5 to about 10 carbon atoms wherein the carbon adjacent a carbon bearing a halogen has no hydrogens. Preferably the latter alcohols include the halogenated neopentyl alcohols, such as tribromoneopentyl alcohol.

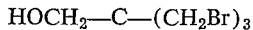

By halogenated, herein, it is meant to include those alcohols or phenols described above which contain one or more chlorine and/or bromine atoms.

The particular $R_2$ groups described in the above monomers permit thermoplastic copolymers prepared therefrom to undergo conventional injection molding without thermal degradation and the liberation of HCl or HBr which causes corrosion to the equipment. Advantageously, the halogen is directly incorporated into polymers by copolymerization which overcomes the problems usually encountered when fire retardant (self extinguishing) additives are physically blended with a polymer, such as loss of the property by "bleeding." Since many of these additives also have plasticizing properties, copolymers prepared from the ester monomers of this invention also have better physical properties.

The monomers of this invention also provide other advantages. A halogen containing monomer based on a styrene (e.g. Example 1) or α-methyl styrene type structure are especially valuable when copolymerized with monomers such as styrene and the like in that the copolymerization is random leading to easy control of an essentially constant composition copolymer.

EXAMPLE 2

Preparation of 2,3,3-tribromoallyl ar-vinylphenylacetate

A solution of 7.38 g. of tribromoallyl alcohol (0.025 mol), 8.10 g. of (vinylphenyl)acetic acid (0.050 mol), 40 mg. of DNOC and 1.5 ml. of Ultra TX acid in 100 ml. of benzene was stirred at reflux in a flask equipped with a Dean-Stark trap. After 40 hr., the theoretical amount (0.45 ml.) of water was collected in the trap. The reaction mixture was washed with two 100 ml. portions of 5% NaHCO₃ and with water. The organic layer was dried over MgSO₄ and the solvent evaporated in vacuo to yield 10.4 g. of crude product. This was chromatographed over 50 g. of alumina with 60–70° C. naphtha eluent to give 6.15 g. of a pale yellow oil. The infrared spectrum of this compound had a strong carbonyl band at 1730 cm.⁻¹ and the 910,990 cm.⁻¹ pair for the —CH=CH₂ group. The NMR spectrum had the usual peaks for the vinyl and aromatic protons and singles at 5.15τ (benzyl methylene protons) and at 6.45τ (—CO₂CH₂—). There were also trace peaks which were ascribed to residual naphtha in the product.

Copolymers are readily prepared with the (vinylaryl) acetic acid esters of this invention by conventional free radical initiated polymerization methods which are well known. Most any copolymerizable monomers or mixtures of same may be used including the monovinyl aromatic monomers such as styrene, vinyl toluene, α-methyl styrene, t-butyl styrene, chloro styrene and the like; the acrylic and methacrylic acids and their various esters such as methyl methacrylate, 2-ethylhexyl acrylate, hydroxyalkyl acrylates and the like; acrylonitrile, vinyl chloride; acrylamide; and a variety of other monomers many of which are commercially available. Polyvinyl compounds may also be employed to produce crosslinked polymers of varying degree depending on the proportions used. Additionally the allyl esters of this invention may be employed as crosslinking monomers.

EXAMPLE 3

Styrene copolymer

Bulk polymerization of a comonomer solution of the vinyl ester prepared in Example 1 with styrene containing 90 mg. of azobisisobutyronitrile (AIBN) as catalyst was carried out for ~20 hrs. in glass bombs immersed in a constant temperature bath maintained at 61° C. Three such copolymers were prepared and the percentage of said vinyl ester in the copolymer was calculated on the basis of oxygen analysis by neutron activation. The samples so obtained are summarized as follows.

| Weight styrene co-monomer (g.) | Weight vinyl ester co-monomer (g.) | Weight copolymer (g.) | Oxygen in copolymer (wt. percent) | Vinyl ester in copolymer (wt. percent) | Bromine in copolymer (wt. percent) |
|---|---|---|---|---|---|
| 80.0 | 1.60 | 36.6 | 0.19±0.01 | 2.7 | 1.4 |
| 75.0 | 8.15 | 41.7 | 1.08±0.03 | 15.9 | 9.1 |
| 70.0 | 17.1 | 38.7 | 1.60±0.05 | 23.5 | 12.0 |

Burn tests of the copolymer.—The copolymers were molded into test bars of dimensions 6" x ½" x ⅟₁₆" for the UL–94 burn test. The results from 3 tests with each copolymer are given below. The times indicated are the averages for each sample to stop burning; the average must be 25 sec. or less to be considered self-extinguishing.

| Bromine in copolymer (wt. percent) | UL–94 burn test |
|---|---|
| 0.0ᵃ | Burned. |
| 1.4 | Do. |
| 8.1 | 12 sec. |
| 12.0 | 3 sec. |

*Sample of polystyrene.

When a sufficient amount of the halogen containing monomer is copolymerized to provide at least about 5 weight percent bromine or at least about 10 weight percent of chlorine in the resulting copolymer, self-extinguishing properties are obtained. The amount of bromine or chlorine may vary depending on the type of copolymer prepared, e.g. it is easier to make polystyrene self-extinguishing than polymethylmethacrylate. It is also possible to admix various additives such as antimony oxide, zinc borate, metal acetyl acetonates and the like which can act synergistically with the halogen and reduce the amount necessary to obtain self-extinguishing properties.

It will be understood that the present invention is not limited to the specific materials, steps or other specific details described in the above examples but may embody various modifications insofar as they are defind in the following claims.

What is claimed is:

1. A self-extinguishing polymer comprising in polymerized form a halogen containing ester corresponding to the formula

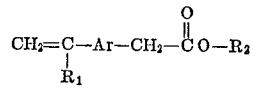

where Ar is a bivalent aromatic hydrocarbon group of 6–20 carbons, $R_1$ is hydrogen or methyl and $R_2$ is a halogen containing group derived from a primary alkyl alcohol having form 5 to about 10 carbons wherein the carbon adjacent to a carbon bearing a halogen has no hydrogen, a halogen substituted phenyl group or a halogen containing vinylic group, and wherein said halogen is chlorine, bromine or a mixture thereof and at least one other monomer copolymerizable therewith wherein said polymer contains at least about 5 weight percent bromine or at least about 10 weight percent chlorine.

2. A copolymer of styrene and said halogen containing ester according to claim 1.

3. A self-extinguishing polymer according to claim 1 wherein the Ar group is a phenylene radical.

4. A self-extinguishing polymer according to claim 1 wherein the $R_2$ group is a 2,3,3-tribromoallyl or tribromoneopentyl radical.

5. A self-extinguishing polymer according to claim 4 wherein the copolymerizable monomer is styrene.

References Cited

UNITED STATES PATENTS

| | | | |
|---|---|---|---|
| 3,073,862 | 1/1963 | Abramo et al. | 260—89.3 |
| 2,127,660 | 8/1938 | Coleman et al. | 260—89.3 |
| 2,572,557 | 10/1951 | Butler | 260—89.3 |

HARRY WONG, JR., Primary Examiner

U.S. Cl. X.R.

260—45.75 R, 85.5 ES, 86.1 R, 86.1 N, 86.1 E, 86.3, 89.3, 469, 476 R